(12) United States Patent
Anupindi et al.

(10) Patent No.: US 8,030,897 B2
(45) Date of Patent: Oct. 4, 2011

(54) BATTERY BACKUP SYSTEM WITH SLEEP MODE

(75) Inventors: Lakshmana M. Anupindi, Suwanee, GA (US); Brad D. Marshall, Newton, KS (US); R. Brian Skinner, Gainesville, GA (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 12/917,680

(22) Filed: Nov. 2, 2010

(65) Prior Publication Data

US 2011/0043043 A1   Feb. 24, 2011

Related U.S. Application Data

(63) Continuation of application No. PCT/US2008/008186, filed on Jul. 1, 2006.

(60) Provisional application No. 61/055,221, filed on May 22, 2008.

(51) Int. Cl.
*H02J 7/00* (2006.01)
*H02J 7/04* (2006.01)
*H02J 7/16* (2006.01)
*H02J 7/24* (2006.01)

(52) U.S. Cl. ........ 320/132; 320/128; 320/136; 320/152; 320/159; 320/162

(58) Field of Classification Search .................... 320/132
See application file for complete search history.

(56) References Cited

U.S. PATENT DOCUMENTS

| | | | | | |
|---|---|---|---|---|---|
| 4,851,756 | A | * | 7/1989 | Schaller et al. | 320/126 |
| 4,866,607 | A | * | 9/1989 | Anderson et al. | 702/11 |
| 5,349,282 | A | * | 9/1994 | McClure | 320/136 |
| 5,493,197 | A | * | 2/1996 | Eguchi et al. | 320/116 |
| 5,541,489 | A | * | 7/1996 | Dunstan | 320/134 |
| 5,640,078 | A | * | 6/1997 | Kou et al. | 320/124 |
| 5,641,587 | A | * | 6/1997 | Mitchell et al. | 429/90 |
| 5,804,891 | A | * | 9/1998 | Marman et al. | 307/66 |
| 6,025,695 | A | | 2/2000 | Friel et al. | 320/106 |
| 6,249,107 | B1 | * | 6/2001 | Wolfe et al. | 320/150 |
| 7,076,606 | B2 | * | 7/2006 | Orsley | 711/114 |

OTHER PUBLICATIONS

"Dual Smart Battery System Manager", Linear Technology, LTC1760, Jan. 2003, 44 pages.

* cited by examiner

*Primary Examiner* — Edward Tso
*Assistant Examiner* — Ahmed Omar
(74) *Attorney, Agent, or Firm* — Christopher P. Maiorana, PC

(57) ABSTRACT

The present invention concerns an apparatus comprising a charger circuit and a control circuit. The charger circuit may be configured to generate a first power down control signal and a second power down control signal in response to (i) a first charge signal, (ii) a second charge signal, (iii) a supply voltage, and (iv) a host control signal. The control circuit may be configured to generate the first charge signal and the second charge signal in response to a first battery signal and a second battery signal. The control circuit may enter a power down state in response to the host control signal initiating the power down state.

16 Claims, 7 Drawing Sheets

US 8,030,897 B2

BATTERY BACKUP SYSTEM WITH SLEEP MODE

This is a continuation of International Application PCT/US2008/008186, with an International Filing Date of Jul. 1, 2008, which claims the priority to U.S. Provisional Application No. 61/055,221, filed May 22, 2008, each of which is incorporated by reference in its entirety.

FIELD OF THE INVENTION

The present invention relates to battery backup systems generally and, more particularly, to a method and/or apparatus for implementing a battery backup system with an embedded charger that enters a sleep mode.

BACKGROUND OF THE INVENTION

Battery packs, such as Lithium-Ion (Li-Ion) battery packs experience a self discharge process when stored, even when not in use. Monitoring circuitry (such as an analog front end—bq29330 and/or a bq20z70, available from Texas Instruments) accelerates the discharge rate when powered by the pack cells. Preventative maintenance charging is needed to prolong battery shelf life when a monitoring gauge uses battery power to monitor a state of health of the cells during storage. Such preventative charging is costly.

To address the discharge issue when storing a battery pack, conventional battery storage systems use a number approaches such as (i) implementing a sleep mode command on the battery charger, (ii) providing a preventative maintenance program that periodically charges the packs, or (iii) configuring the design with a mechanical connection so that the battery packs are not connected to the charger when the packs are not installed.

Such systems have one or more disadvantages. The sleep command of a typical charger is not effective when implemented on a two pack system. A two pack configuration from an I2C switch of a typical charger is a passive switch command. Additionally, many of the systems configured with a battery pack will be shipped with the battery packs installed. Preventative maintenance charging needs to be reserved for field replacement units. The physical chassis on many designs are often set by the standard bridge bay (SBB) specification. The space for a battery back-up chassis is a predefined form factor. Such a form factor needs a design that maintains the predefined volumetric limitations.

It would be desirable to implement a battery backup system that fits in a predefined form factor and with an embedded charger implements a low power mode that allows two or more battery packs to remain in a usable state during storage.

SUMMARY OF THE INVENTION

The present invention concerns an apparatus comprising a charger circuit and a control circuit. The charger circuit may be configured to generate a first power down control signal and a second power down control signal in response to (i) a first charge signal, (ii) a second charge signal, (iii) a supply voltage, and (iv) a host control signal. The control circuit may be configured to generate the first charge signal and the second charge signal in response to a first battery signal and a second battery signal. The control circuit may enter a power down state in response to the host control signal initiating the power down state.

The objects, features and advantages of the present invention include providing a battery backup system that may (i) provide an embedded charger, (ii) be implemented using a minimal amount of hardware, (iii) be implemented using a minimal amount of firmware, (iv) be implemented using existing charging systems, (v) improve the shelf life of stored battery packs, (vi) minimize discharge from in-system storage to maximize calendar life, and/or (vii) allow a device powered by the system to off load the contents of a cache memory to permanent storage prior to a power down of the system.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
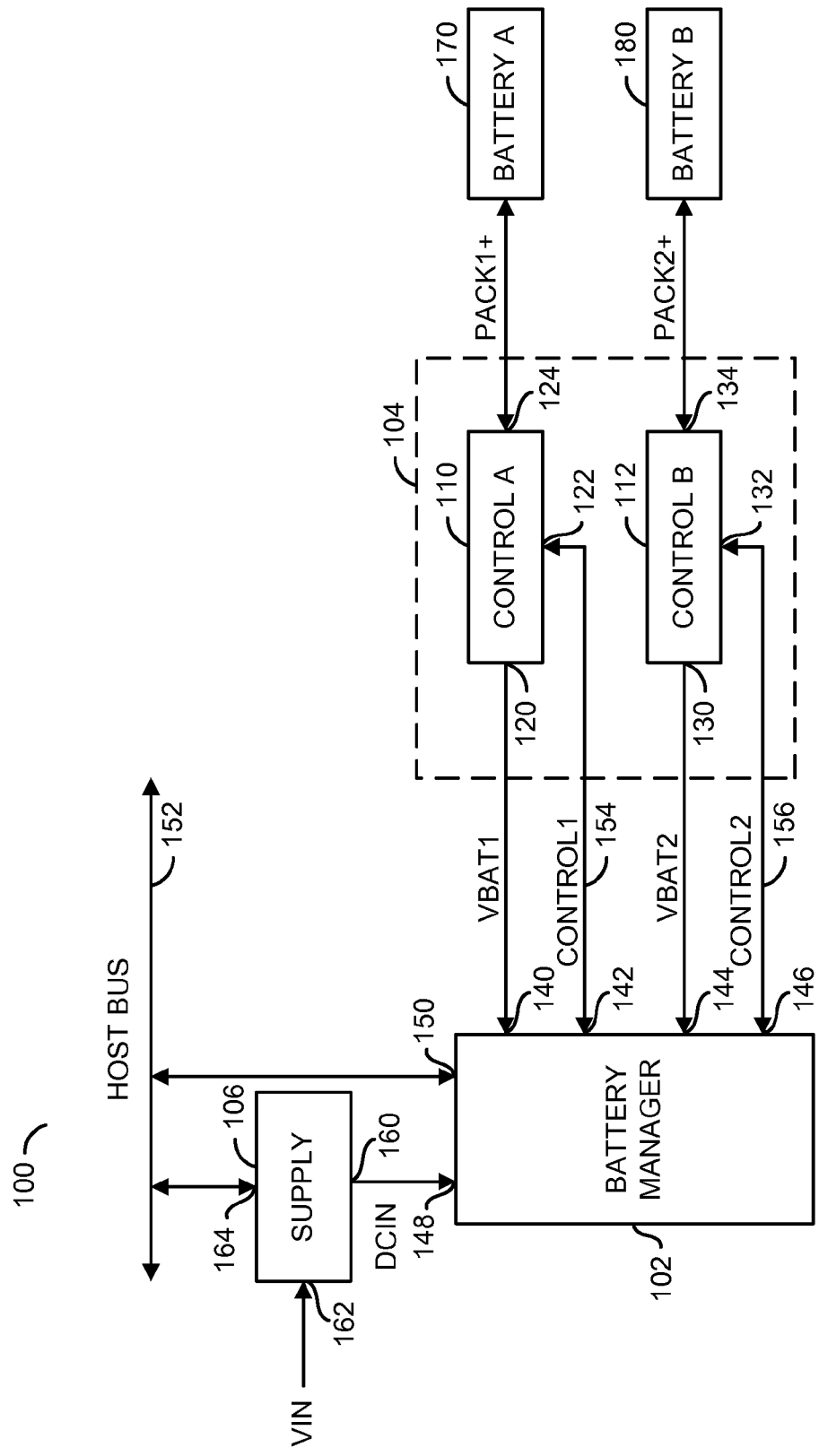
FIG. 1 is a block diagram of an embodiment of the present invention.

Referring to FIG. 1, a system 100 is shown in accordance with the present invention. The system 100 generally comprises a block (or circuit) 102, a block (or circuit) 104 and a block (or circuit) 106. The circuit 102 may be implemented as a battery manager circuit. The circuit 102 may include a charging portion. In one example, the circuit 102 may be implemented as an LTC1760, manufactured by Linear Technology. However, other types chargers may be implemented to meet the design criteria of a particular implementation. The LTC1760 may be an appropriate choice as the battery manager circuit 102 that provides a multiplex bus for charging, I2C communication, and/or a power path load sharing capability. The system 100 may allow the circuit 102 to operate using embedded packs that operate using multiple power supplies. The system 100 may also provide a charge/communication mode.

The circuit 104 may be implemented as a control circuit. In one example, the circuit 104 may be implemented as a power path multiplexer circuit. The circuit 106 may be implemented as a supply circuit. The circuit 104 generally comprises a block (or circuit) 110 and a block (or circuit) 112. The circuit 110 may have an output 120 that may present a signal (e.g., VBAT1), an input/output 122 that may present/receive a signal (e.g., CONTROL1) and an input/output 124 that may present/receive a signal (e.g., PACK1+). The signal CONTROL1 may represent one or more power down control signals sent between the circuit 110 and the battery manager 102. The signal PACK1+ may represent a battery signal sent between a battery 170 and the circuit 110. The signal VBAT1 may represent a charge signal sent from the circuit 110 to the battery manager 102. The circuit 112 may have an output 130 that may present a signal (e.g., VBAT2), an input/output 132 that may present/receive a signal (e.g., CONTROL2) and an input/output 134 that may present/receive a signal (e.g., PACK2+). The signal CONTROL2 may represent one or more power down control signals sent between the circuit 112 and the battery manager 102. The signal PACK2+ may represent a battery signal sent between a battery 180 and the circuit 112. The signal VBAT2 may represent a charge signal sent from the circuit 112 to the battery manager 102. The signal PACK1+ and the signal PACK2+ may be signals used to charge the battery 170 and the battery 180 when the system 100 receives an external power source. The signal PACK1+ and the signal PACK2+ may also be used to provide power to the system 100 when an external power source is not available.

The circuit 102 may have an input 140 that may receive the signal VBAT1, an input/output 142 that may present/receive the signal CONTROL1, an input 144 that may receive the signal VBAT2 and an input/output 146 that may present/receive the signal CONTROL2. The circuit 102 may also have an input 148 that may receive a signal (e.g., DCIN), and an input/output 150 that may be connected to a host bus 152. In one example, the signal DCIN may be a supply voltage. The signal CONTROL1 may be connected between the input/output 142 and the input/output 122 though a secondary bus 154. The signal CONTROL2 may be connected between the input/output 146 and the input/output 132 though a secondary bus 156. In one example, the host bus 152, the secondary bus 154, and the secondary bus 156 may be implemented as I2C compliant buses. However, other bus types may be implemented to meet the design criteria of a particular implementation. In one example, the battery manager 102 may receive a host control signal from the host bus 152. The inputs and/or outputs 140, 142, 144, 146, 148, and 150 may also be referred to as pins, input pins, output pins, etc.

The circuit 106 may have an output 160 that may present the signal DCIN, an input 162 that may receive a signal (e.g., VIN) and an input/output 164 that may present/receive information to/from the host bus 152. In one example, the signal VIN may be implemented as a +20V signal. However, other voltages may be used. For example, a voltage between 18v and 22v, or between 15v and 25v may be used.

Figure 2:
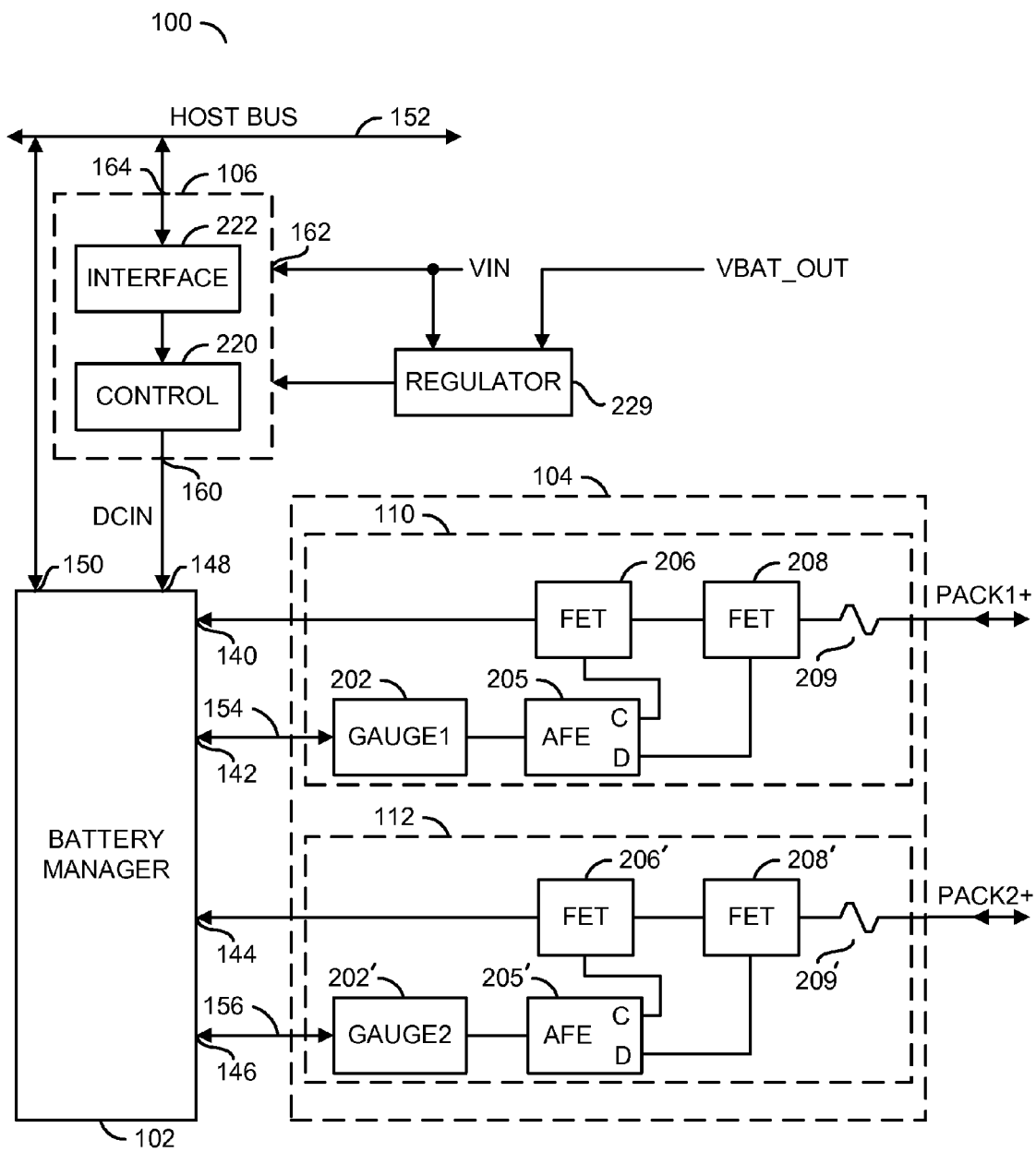
FIG. 2 is a more detailed diagram of the present invention.

Referring to FIG. 2, a more detailed diagram of the circuit 100 is shown. The circuit 110 generally comprises a block (or circuit) 202, a block (or circuit) 205, a block (or circuit) 206, a block (or circuit) 208 and a circuit 209. The circuit 202 may be implemented as a gauge. The gauge 202 may be used to determine the amount of charge left in the battery 170. In one example, the circuit 202 may be implemented as a bq20z70, manufactured by Texas Instruments. However, other types of gauges may be implemented to meet the design criteria of a particular implementation. The circuit 205 may be implemented as an analog front end (AFE) circuit. In one example, the circuit 205 may be implemented as a bq29330, manufactured by Texas Instruments. However, other types of analog front end circuits may be implemented to meet the design criteria of a particular implementation. The circuit 206 may be implemented as a transistor, such as a field effect transistor (FET), more particularly as an n-channel field effect transistor. The circuit 208 may be implemented as a transistor, such as a field effect transistor, more particularly as an n-channel field effect transistor. The circuit 209 may be implemented as a fuse circuit. The circuit 112 may be implemented with components 202', 205', 206', 208' and 209' similar to the circuits 202, 205, 206, 208 and 209.

The circuit 106 may be implemented as a block (or circuit) 220 and a block (or circuit) 222. The circuit 220 may be implemented as a control circuit. The circuit 220 may comprise a plurality of field effect transistors. The circuit 222 may be implemented as an interface circuit. In one example, the circuit 222 may be implemented as a LTC4302, manufactured by Linear Technology.

To begin the power down operation, the system 100 may turn the discharge transistors 208 and 208' off. The discharge transistors 208 and 208' may be turned off by a command sent as the power down control signals CONTROL1 or CONTROL2 in a format generated by a host (not shown, but connected to the host bus 152) through the battery manager 102 (e.g., a command offset 46 and command sending 04). The host may be connected to the control circuit 110, through the secondary bus 154, to turn off the discharge transistor 208. The host may be connected to the control circuit 112, through the secondary bus 156, to turn off the discharge transistor 208'. When the discharge transistors 208 and 208' are turned off, the signals VBAT1 and VBAT2 are normally removed from the battery manager 102.

Even with the discharge transistors 208 and 208' turned off, the input 140 and/or the input 144 may still measure +5V due to the signal VIN (e.g., +20V) being connected to the signal DCIN. The interface circuit 222 may be used to disconnect the signal VIN by removing the connection of the signal DCIN from the input 148. The system 100 may also include a regulator 229. The regulator 229 may be implemented as a low drop out (LDO) regulator, a logic voltage regulator, or other types of regulators needed to meet the design criteria of a particular implementation. The regulator 229 may be disabled via the interface circuit 222. The interface circuit 222 may receive one or more signals from the host bus 152.

As a result of the above actions, power may be removed from the battery manager 102. When the battery manager 102 has no power, and the buses 154 and 156 of individual gauges 202 and 202' are low (e.g., no active pull ups), the gauges 202 or 202' and the circuits 205 or 205' may enter a sleep mode. The sleep mode may represent a second mode. In the sleep mode, the battery 170 and the battery 180 may supply, in one example, approximately 60 uA. When in the sleep mode, the gauges 202 and 202' may check the power left in the battery 170 and in the battery 180 less often then when in the first mode. For example, when in the sleep mode, the gauges 202 and 202' may check the power left in the battery 170 and the battery 180 every 5-20 s. While in a first mode (e.g., a full power mode), the gauges 202 and 202' may check the power left in the battery 170 and the battery 180 every 5-10 ns.

The system 100 may be implemented with minimal amount of hardware. The interface circuit 222 may control the signal DCIN and the signal VIN presented to the battery manager 102. The regulator 229 may be used to supply power (e.g., +3.3V) to the interface circuit 222. The circuits 205 and 205' may have an internal regulator that may also generate +3.3V output. If the internal regulators are used by the system 100, then the sleep mode of the circuit 102 is normally bypassed. The system 100 may use one or more internal pull-up transistors of the battery manager 102 to initiate the sleep mode. The internal pull up transistors may be controlled through the secondary buses 154 and 156. With such an implementation, external pull-ups may not be needed.

The power down control signals CONTROL1 and CONTROL2 may be controlled by firmware stored on a device connected to the host bus 152. In one example, such a device may be implemented as a Redundant Array of Independent Disks (RAID) controller. Such firmware may be implemented to control the discharge circuits 208 and 208'. For example, a command (e.g., 0x04) sent to the control registers of the gauges 202 and 202' may be used to turn off the discharge circuits 208 and 208'. A value of 0x06 may be written to the control register of the gauges 202 and 202' to turn on the discharge circuits 208 and 208'. Such firmware may be used to monitor the health and/or perform manipulation routines of the system 100. One or more predefined routines and/or procedures may be configured to perform specific tasks. For example, cache data (or other temporary data) stored on a RAID controller connected to the host bus 152 may be saved to one or more external hard drives prior to exhausting all of the power stored in the battery 170 and the battery 180.

The system 100 may be implemented with a minimal amount of firmware support to control the circuits 202 and 205, the circuits 202' and 205' and the discharge circuits 208 and 208'. The system 100 may increase the shelf storage life of the battery 170 and the battery 180. The system 100 may be useful in the storage of the battery 170 and the battery 180. The system 100 may minimize discharge during storage to maximize calendar life and/or meta data storage capability.

Figure 3:
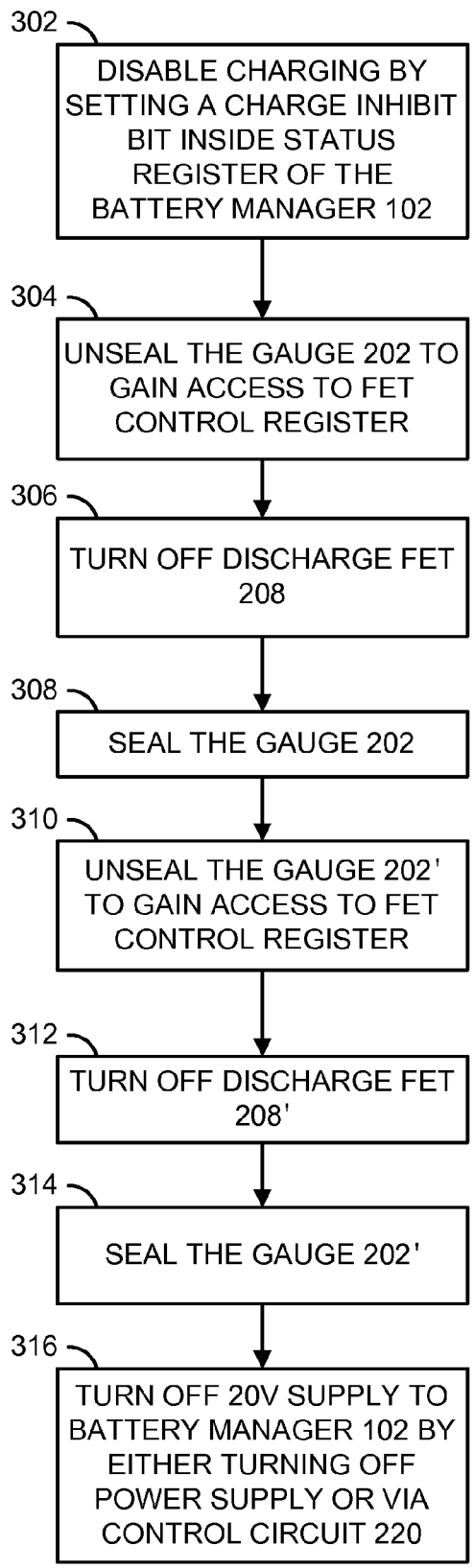
FIG. 3 is a flow diagram illustrating a process to put the battery system into sleep mode.

Referring to FIG. 3, a diagram illustrating a method (or process) 300 in accordance with the present invention is shown. The method generally comprises a step (or state) 302, a step (or state) 304, a step (or state) 306, a step (or state) 308, a step (or state) 310, a step (or state) 312, a step (or state) 314 and a step (or state) 316. The state 302 may disable charging by setting a charge inhibit bit inside the status register of the battery manager 102. Next, the state 304 may unseal the gauge 202 to gain access to the FET control register. Unsealing the gauge 202 generally refers to using a control bit to enable access to the control registers. The control bit may be a bit that was set up during the initial configuration of the control register. Next, the state 306 turns off the discharge FET 208. Next, the state 308 seals the gauge 202. Next, the state 310 unseals the gauge 202' to gain access to the FET control register. Next, the state 312 turns off the discharge FET 208'. Next, the state 314 seals the gauge 202'. Next, the state 316 turns off the supply to the battery manager 102 by either turning off the power supply or through the control circuit 220.

Figure 4:
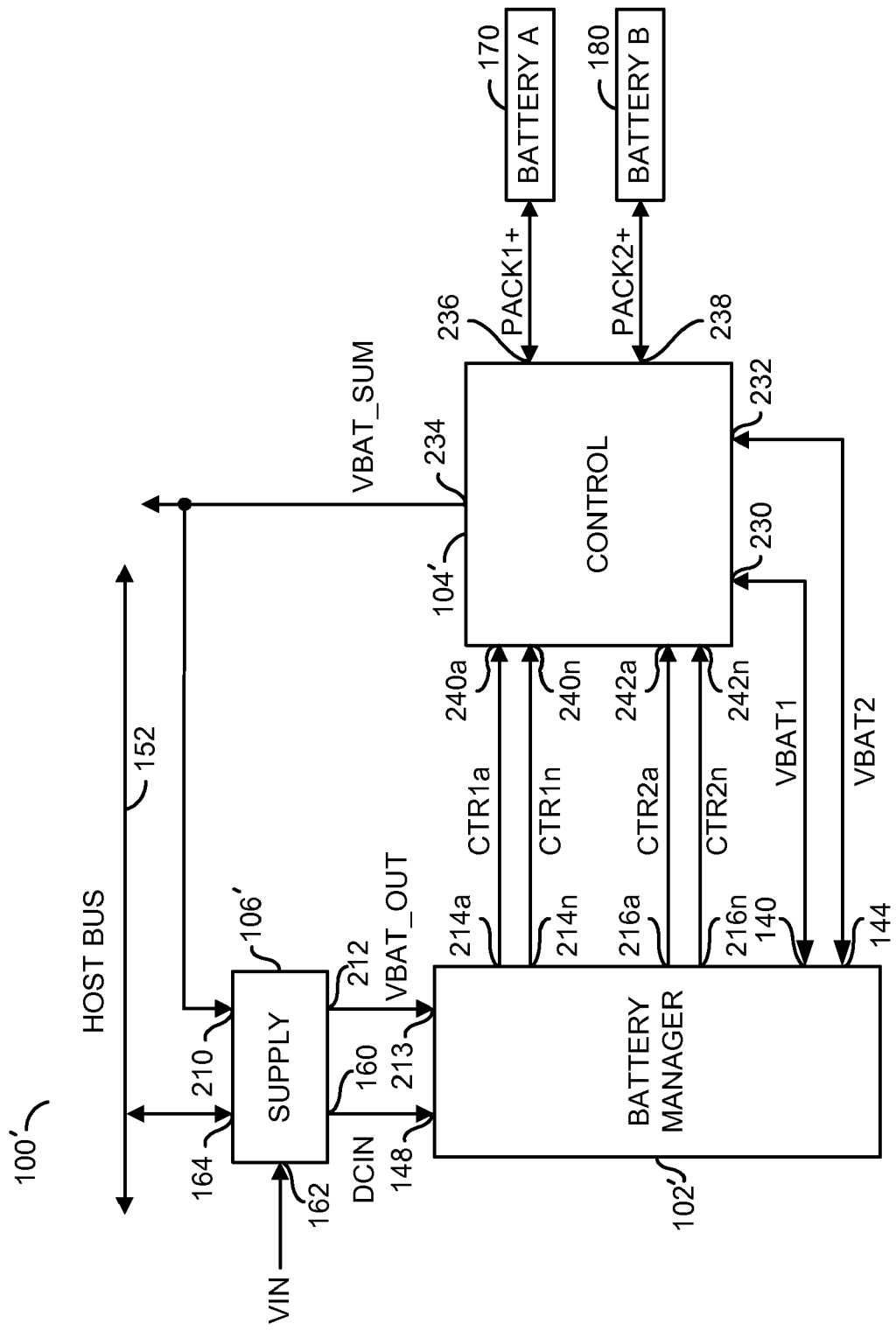
FIG. 4 is a block diagram of another embodiment of the present invention.

Referring to FIG. 4, a system 100' is shown implementing an alternate embodiment of the present invention. The system 100' generally comprises a circuit 102', a circuit 104', and a circuit 106'. The circuits 102', 104' and 106' may have a similar implementation to the circuits 102, 104 and 106 of FIG. 1. The circuit 106' may also have an input 210 that may receive a signal (e.g., VBAT_SUM) and an output 212 that may present a signal (e.g., VBAT_OUT).

The circuit 102' may also have a set of outputs 214a-214n and a set of outputs 216a-216n. The outputs 214a-214n may present a number of control signals (CTR1a-CTR1n). The outputs 216a-216n may present a number of control signals (CTR2a-CTR2n). The circuit 102' may also have an input 213 that mat receive the signal VBAT_OUT. The circuit 102' may be powered by the signal VBAT1, the signal VBAT2, or the signal DCIN. If none of these signals are sufficient to operate the circuit 102', a power not good (PNG) condition may result.

The circuit 104' may have a set of inputs 240a-240n that may receive the signals CTR1a-CTR1n and a set of inputs 242a-242n that may receive the signals CTR2a-CTR2n. The circuit 104' may also have an input 230 that may receive the signal VBAT1, an input 232 that may receive the signal VBAT2, an output 234 that may present the signal VBAT_SUM, an input/output 236 that may present/receive the signal PACK1+, and an input/output 238 that may present/receive the signal PACK2+.

Figure 5:
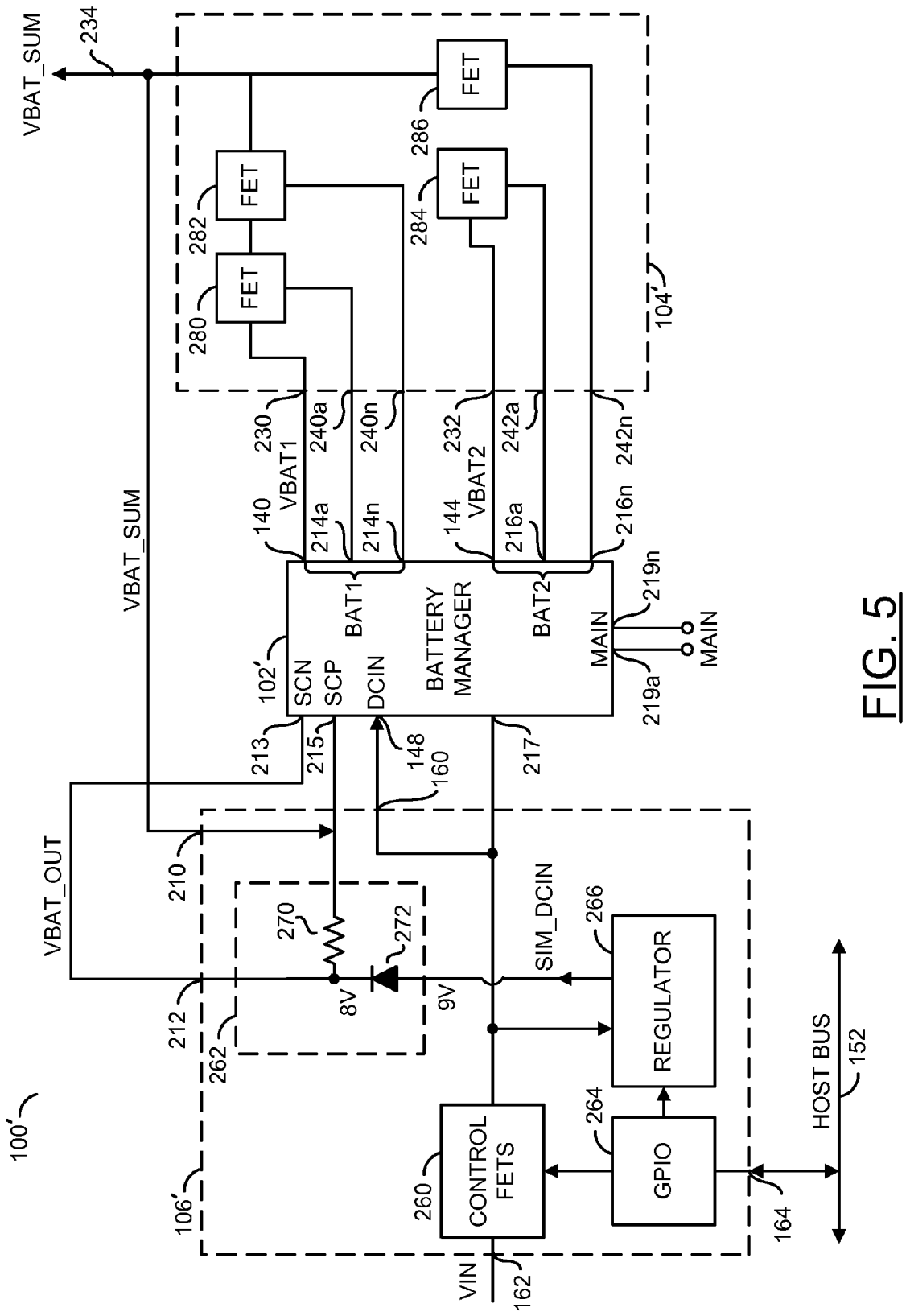
FIG. 5 is a more detailed diagram of the embodiment of FIG. 4.

Referring to FIG. 5, a more detailed diagram of the system 100' is shown. The circuit 106' generally comprises a block (or circuit) 260, a block (or circuit) 262, a block (or circuit) 264 and a block (or circuit) 266. The circuit 260 may be implemented as a set of control field effect transistors. The circuit 262 may be implemented as a resistor 270 and a diode 272. The circuit 264 may be implemented as an addressable general purpose input/output (GPIO) register. The circuit 266 may be implemented as a regulator configured to generate a signal (e.g., SIM_DCIN). The signal SIM_DCIN may be used to provide a power source to the circuit 102' when power is not present on the signal VBAT1, the signal VBAT 2, or the signal DCIN. By generating the signal SIM_DCIN during such a condition, the PNG condition is avoided and the system 100' may continue to operate. The circuit 260 may receive the signal VIN. The circuit 262 may receive the signal VBAT_SUM and the signal VBAT_OUT. The circuit 264 may receive data signals from the host bus 152. In one example, the circuit 264 may be implemented as a LTC4302, manufactured by Linear Technologies. However, other buffers may be implemented to meet the design criteria of a particular implementation. In one example, the circuit 266 may be implemented as a LT3010, manufactured by Linear Technologies. However, other regulators may be implemented to meet the design criteria of a particular implementation.

The circuit 104' generally comprises a block (or circuit) 280, a block (or circuit) 282, a block (or circuit) 284, and a block (or circuit) 286. The circuits 280, 282, 284, and 286 may be implemented as transistors. In one example, the circuits 280, 282, 284, and 286 may be implemented as p-channel field effect transistors. However, other transistor types may be implemented to meet the design criteria of a particular implementation.

The circuit 102' may have an input 140 that may receive the signal VBAT1, an input 144 that may receive the signal VBAT2, an input 148 that may receive power at a pin (e.g., DCIN), a set of inputs 214a-214n that may receive a first set of control signals, a set of inputs 216a-216n that may receive a second set of control signals, an input 213 that may receive the signal VBAT_OUT at a pin (e.g., SCN), an input 215 that may receive power at a pin (e.g., SCP), an input 217 that may receive the signal VIN, and a set of inputs 219a-219n that may receive power at a pin (e.g., MAIN). The pin MAIN may receive a supply voltage. For example, the pin MAIN may normally receive DC power from a power supply connected to a wall outlet. In general, when the system 100' receives power from the inputs 219a-219n, the other power sources are disabled.

A typical voltage regulation module (VRM) of a typical base card cannot operate a +20V. The maximum voltage (e.g., Vmax) for a VRM is normally 14V. Hence we have not populated the DC leg of the power path multiplexer circuit 104' of the battery manager 102'. So, it is not the case that the circuit 260 is preventing the +20V rail from going to the base card. The power path multiplexer circuit 104' will pass the highest potential of the three available sources (e.g., VBAT1, VABT2, and VIN) as the signal VBAT_SUM. The leg receiving the signal VIN of the power path multiplexer circuit 104' of the circuit 102' in not used to avoid damage to the VRM. The regulator 266 may be used to prevent the PNG condition from occurring. This allows energy from the two battery packs to pass to the system load through the diode-ORing circuit 262. The PNG condition will turn off the power path multiplexer circuit 104' such that the signal VBAT1 and the signal VBAT2 do not supply power to the signal VBAT_SUM. In general, the power path multiplexer circuit 104' turns off the signal VBAT1 and the signal VBAT2 and the batteries do not supply the load. The PNG condition makes the batteries 170 and 180 not enabled for powering the system 100'.

In general, the system 100' prevents the signal VIN (e.g., +20V) from being passed through the power of the battery manager 102' to the base card of the device using the system 100'. Without such protection, the signal VIN could possibly damage the base card of a device using the system 100'. The battery manager 102' normally has a power management system that implements a 3-strike rule based on an internal timer. If power is available on the signal VBAT_SUM, and the signal VIN is applied to the system 100' without the DC path of the power path multiplexer circuit 104' being populated, the low power comparator of the battery manager 102' will trip, placing the battery manager 102' in a power not good mode.

The system 100' may be used to avoid the power not good condition in a two pack system without implementing a separate charger (and an independent diode—or power path) for each of the battery packs 170 and 180. The system 100' reduces the number of I2C switches and nodes (e.g., one switch and one node for each charger) compared with a two charger system. By reducing the number of switch nodes, the system 100' may also reduce switch noise.

The circuit 266 may be biased to a predetermined voltage (e.g., +9.0V). The output of the circuit 266 may be connected to the diode 272. The diode 272 may be combined with the signal VBAT_OUT through a OR operation. The input 148 of the battery manager 102' normally receives the signal DCIN that is normally still supplied from the circuit 106' and controlled by the DC rail signal VIN. Therefore, whenever the signal VIN is applied to the system 100', the battery manager 102' will always see a minimum potential of +8V at the pin SCN.

The circuit 266 may be implemented having a slew rate sufficient to ensure that the pin SCN has a valid potential before the time out of the low power comparator (15 mS) in the absence of battery power. The diode OR-ing of the signal DCIN may ensure that no back biasing to the circuit 266 occurs. If the signal VIN is implemented as +20V, the signal (or input pin) DCIN of the battery manager 102' may yield a maximum current supply to the internal VCC regulator. The circuit 266 may implement an output of +9V to minimize the possibility of the circuit 266 supplying the VRM of the base card. The interface circuit 222 may allow the signal DCIN to be shut off for proper learn cycle and/or coulomb counting.

The system 100' may keep the battery manager 102' out of the power not good mode when initializing a power up sequence on the battery packs 170 and 180. The system 100' may (i) be implemented with minimal support circuits (e.g., the circuit 266 and the diode 262), (ii) provide the signal VIN at +20V that is never supplied to the base card VRM, (iii) provide a simulated-DCIN circuit 266 that may allow the system 100' to be implemented as a single integrated charger with autonomous charging and/or power path switching.

The system 100' may (i) reduce component count, (ii) reduce I2C bus switches compared to an implementation where separate chargers are utilized, (iii) be implemented without an external diode-OR power path, and/or (iv) shut off the signal DCIN for proper discharge phase of learn cycles.

Figure 6:
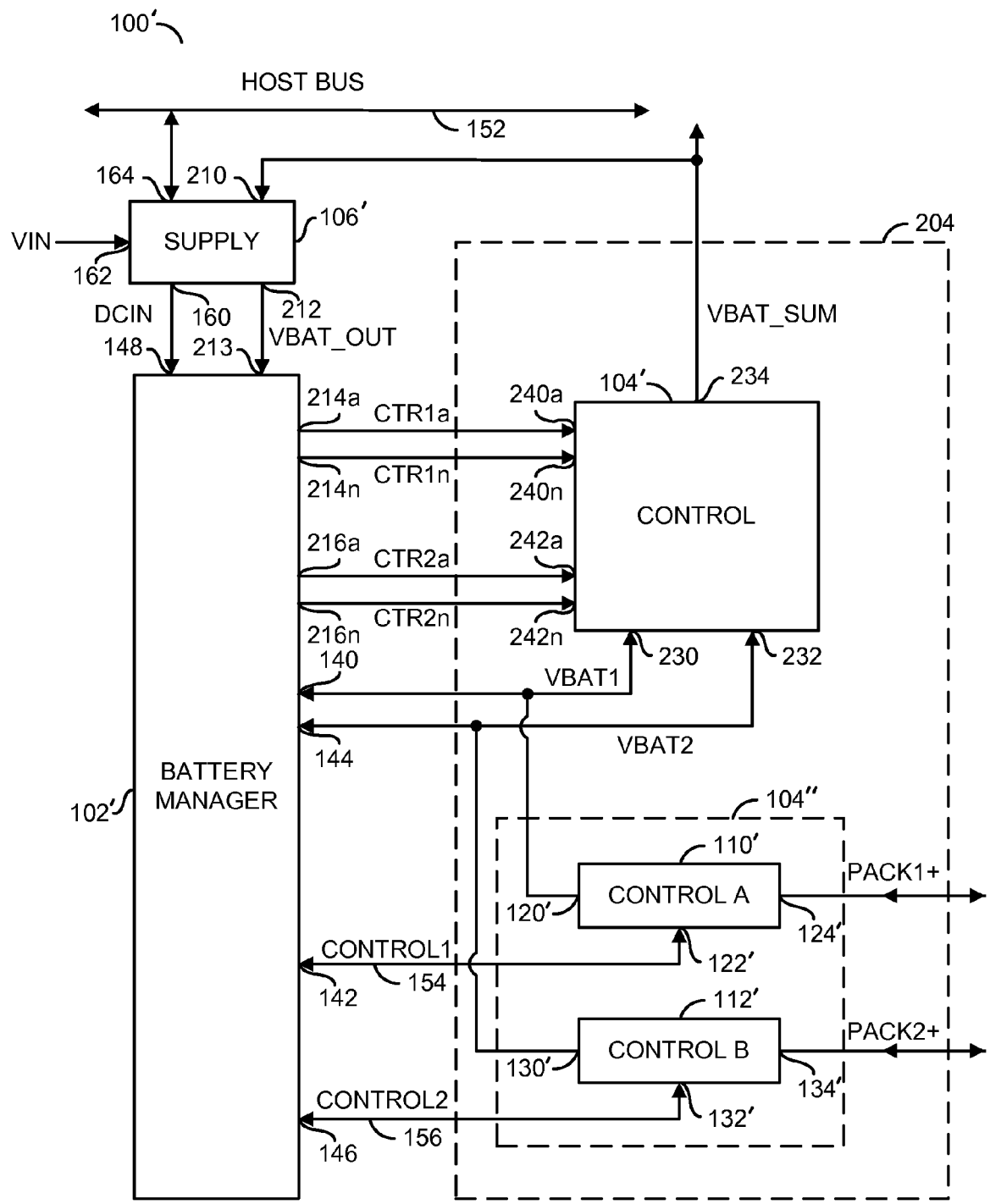
FIG. 6 is a more detailed diagram of another embodiment of the present invention.

Referring to FIG. 6, a more detailed diagram of the circuit 100' is shown. The circuit 204 shows the control circuit 104' and a control circuit 104". The control circuit 104" is implemented similarly to the control circuit 104 of FIGS. 1 and 2. Similarly, the details of the control circuit 110 and the control circuit 112 shown in FIG. 2 may also be implemented in the control circuit 104" of FIG. 6.

Figure 7:
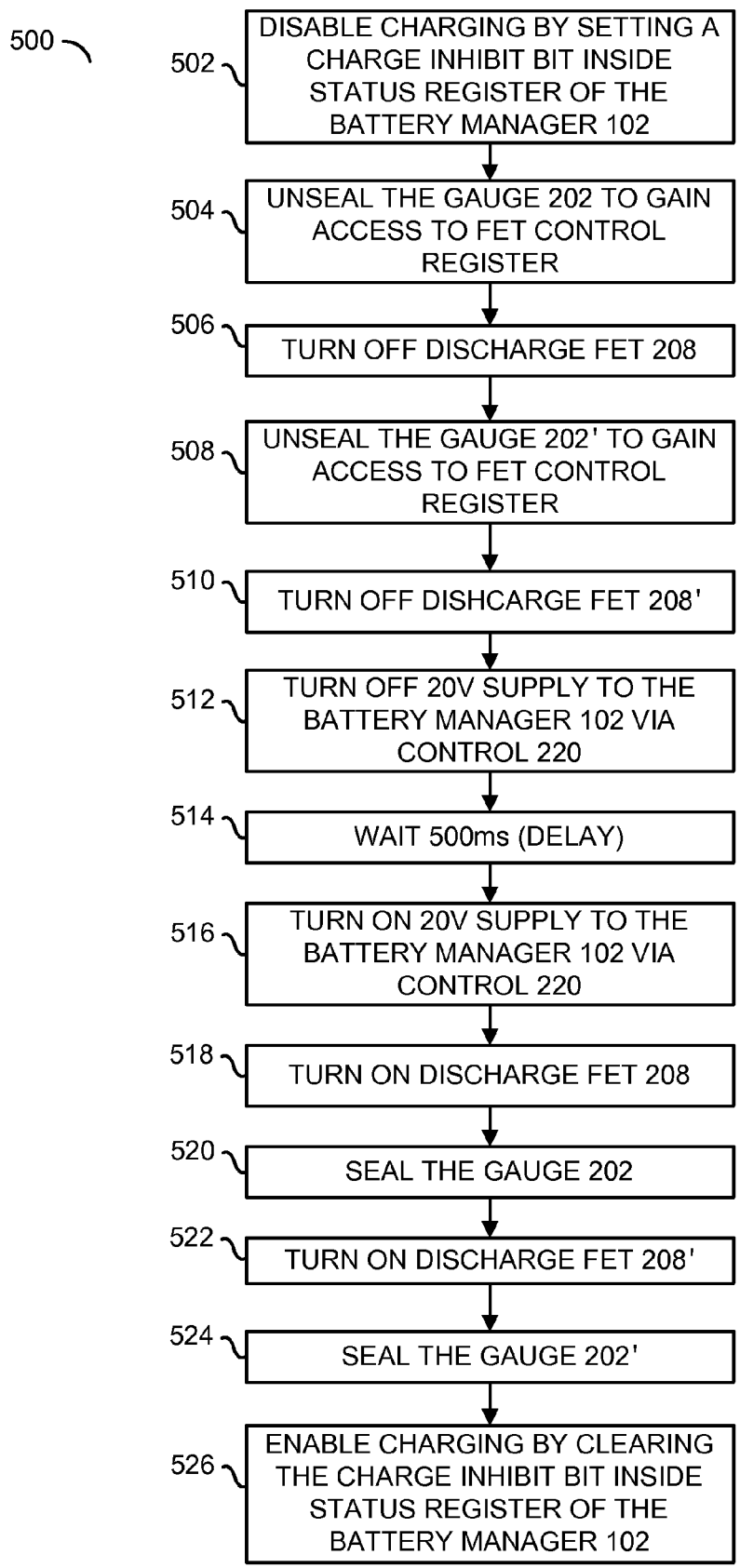
FIG. 7 is a flow diagram illustrating a process to clear power not good mode of a charger.

Referring to FIG. 7, a diagram illustrating a method (or process) 500 is shown. The method 500 generally comprises a step (or state) 502, a step (or state) 504, a step (or state) 506, a step (or state) 508, a step (or state) 510, a step (or state) 512, a step (or state) 514, a step (or state) 516, a step (or state) 518, a step (or state) 520, a step (or state) 522, a step (or state) 524, and a step (or state) 526. The state 502 may disable charging by setting a charge inhibit bit inside the status register of the battery manager 102. Next, the state 504 may unseal the gauge 202 to gain access to the FET control register. Unsealing the gauge 202 generally refers to using a control bit to enable access to the control registers. The control bit may be a bit that was set up during the initial configuration of the control register. Next, the state 506 turns off the discharge FET 208. Next, the state 508 may unseal the gauge 202' to gain access to the FET control register. Next, the state 510 turns off the discharge FET 208'. Next, the state 512 turns off the supply to the battery manager 102 via the control circuit 220. Next, the state 514 delays for 500 ms. Next, the state 516 turns the supply to the battery manager 102 on via the control 220. Next, the state 518 turns on the discharge FET 208. Next, the state 520 seals the gauge 202. Next, the state 522 turns on the discharge FET 208'. Next, the state 524 seals the gauge 202'. Next, the state 526 enables charging by clearing the charge inhibit bit inside the status register of the battery manager 102.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a charger circuit configured to generate a first power down control signal and a second power down control signal in response to (i) a first charge signal, (ii) a second charge signal, (iii) a supply voltage, and (iv) a host control signal; and
   a control circuit configured to generate said first charge signal and said second charge signal in response to a first battery signal and a second battery signal, wherein (A) (i) said apparatus enters a power down state in response to said host control signal initiating said power down state, (ii) said control circuit enters a sleep mode in said power down state and (iii) said control circuit disconnects operating power from said charger circuit in said power down state, (B) said charger circuit receives power from (i) said supply voltage when said apparatus is in a first mode, and (ii) at least one of said first charge signal and said second charge signal when said apparatus is in a second mode, (C) said control circuit monitors a remaining battery charge of said first battery signal and said second battery signal according to a first checking protocol when said apparatus is in said first mode, and (D) said control circuit monitors said remaining battery charge of said first battery signal and said second battery signal according to a second checking protocol when said apparatus is in said power down state, wherein said second checking protocol uses less power than said first checking protocol.

2. The apparatus according to claim 1, wherein said control circuit enters said sleep mode when said apparatus is in said second mode and both said first charge signal and said second charge signal are removed from said charger circuit.

3. The apparatus according to claim 1, wherein said control circuit comprises a first gauge circuit and a second gauge circuit configured to operate in a low power mode when said apparatus is in said power down state.

4. The apparatus according to claim 3, wherein said control circuit further comprises a first analog front end circuit and a second analog front end circuit configured to operate in said low power mode when said apparatus is in said power down state.

5. The apparatus according to claim 2, wherein (i) said first battery signal is received from a first battery pack and (ii) said second battery signal is received from a second battery pack.

6. The apparatus according to claim 1, wherein said host control signal is received through a control bus.

7. The apparatus according to claim 1, wherein said apparatus is configured to power a Redundant Array of Independent Disks (RAID) controller.

8. An apparatus comprising:
   means for generating a first power down control signal and a second power down control signal in response to (i) a first charge signal, (ii) a second charge signal, (iii) a supply voltage, and (iv) a host control signal; and
   means for generating said first charge signal and said second charge signal in response to a first battery signal and a second battery signal, wherein (i) said apparatus enters a power down state in response to said host control signal initiating said power down state, (ii) said means for generating said first charge signal and said second charge signal enters a sleep mode in said power down state and (iii) said means for generating said first charge signal and said second charge signal disconnects operating power from said means for generating said first power down control signal and said second power down control signal in said power down state and (C) said apparatus is further configured to (i) control charging and discharging of said first battery by generating a plurality of first control signals on a first bus, (ii) control said charge and a discharge of said second battery by generating a plurality of second control signals on a second bus, (iii) draw an operating power from any available among a main power source, said first battery and said second battery and (iv) release both said first bus and said second bus when said operating power is unavailable.

9. An apparatus comprising:
   an input circuit configured to generate a simulated power supply signal having an enabled state and a disabled state in response to a main power source and a host control signal received from a host bus; and
   a charger circuit configured to avoid a power not good condition that disables operation of said charger circuit when said simulated power supply signal is in said enabled state, wherein (A) said charger circuit (i) is configured to charge a first battery and a second battery when said main power source is present, and (ii) protects an over voltage condition of said main power source from damaging said host bus, (B) said power not good condition occurs when initializing a power up sequence of said apparatus with said first battery unavailable, said second battery unavailable and said simulated power supply signal in said disabled state and (C) said charger circuit is further configured to (i) control said charge and a discharge of said first battery by generating a plurality of first control signals on a first bus, (ii) control said charge and a discharge of said second battery by generating a plurality of second control signals on a second bus, (iii) draw an operating power from any available among said main power source, said first battery and said second battery and (iv) release both said first bus and said second bus when said operating power is unavailable.

10. The apparatus according to claim 9, wherein said charger circuit is configured to operate using power received from said first battery and said second battery when said main power source is not present.

11. The apparatus according to claim 9, wherein said host bus comprises an I2C bus.

12. The apparatus according to claim 9, wherein said apparatus is configured to power a Redundant Array of Independent Disks (RAID) controller.

13. The apparatus according to claim 9, wherein said charger circuit is further configured to perform a coulomb counting when said simulated power supply signal is in said disabled state.

14. The apparatus according to claim 9, further comprising a control circuit configured to generate a sum signal conveying a highest available voltage from among said main power source, said first battery and said second battery.

15. The apparatus according to claim 14, wherein said input circuit is further configured to generate an output signal from said sum signal, said output signal powering a load connectable to said apparatus.

16. The apparatus according to claim 9, further comprising a control circuit configured to (i) selectively switch a first battery signal of said first battery to and from said charger circuit in response to said first control signals, (ii) selectively switch a second battery signal of said second battery to and from said charger circuit in response to said second control signals and (iii) enter a sleep mode in response to said charger circuit releasing both said first bus and said second bus.

* * * * *